United States Patent [19]
Leclaire et al.

[11] Patent Number: 5,178,024
[45] Date of Patent: Jan. 12, 1993

[54] METAL BELLOWS TYPE SEALED ROTARY TRANSMISSION DEVICE

[75] Inventors: Rémy Leclaire; Daniel Pottier, both of Pont-Audemer, France

[73] Assignee: Normetex, Pont-Audemer, France

[21] Appl. No.: 781,158

[22] PCT Filed: Apr. 11, 1991

[86] PCT No.: PCT/FR91/00298
§ 371 Date: Nov. 8, 1991
§ 102(e) Date: Nov. 8, 1991

[87] PCT Pub. No.: WO91/16559
PCT Pub. Date: Oct. 31, 1991

[30] Foreign Application Priority Data
Apr. 12, 1990 [FR] France ................. 90 04733

[51] Int. Cl.$^5$ ............... F16H 25/04; F16K 41/10; F16K 31/52
[52] U.S. Cl. .......................... 74/18; 74/63; 74/570; 251/251
[58] Field of Search .............. 74/18, 18.1, 63, 570; 251/335.3, 251

[56] References Cited
U.S. PATENT DOCUMENTS
2,137,303 11/1938 Nelson ................. 286/11
4,892,010 1/1990 Pottier et al. ........... 74/18.1 X FOREIGN PATENT DOCUMENTS
78156 5/1962 France ................. 74/18.
2617567 6/1989 France .
377605 6/1964 Switzerland .
826513 1/1960 United Kingdom ........ 74/18.1

Primary Examiner—Allan D. Herrmann
Attorney, Agent, or Firm—Perry Carvellas

[57] ABSTRACT

A sealed transmission device for controlling a valve including a casing containing a transfer member coupled to a control shaft and to a receiver shaft. A bellows surrounds the receiver shaft and is fixed and sealed at its upper end to the transfer member and is fixed and sealed at its lower end to the casing. The transfer member is operably connected to a tilting member, which tilting member is adapted to protect the bellows from the effects of torsion due to rotation of the control shaft.

13 Claims, 3 Drawing Sheets

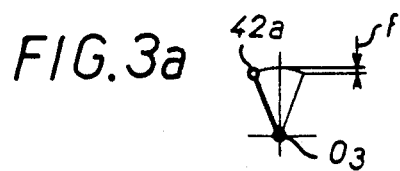
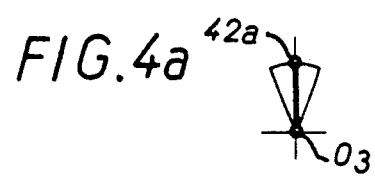
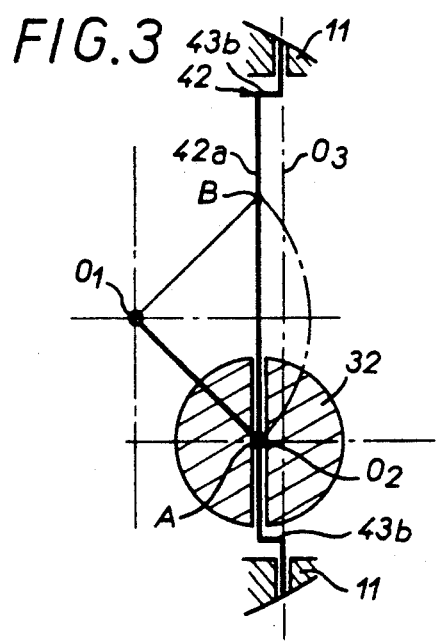
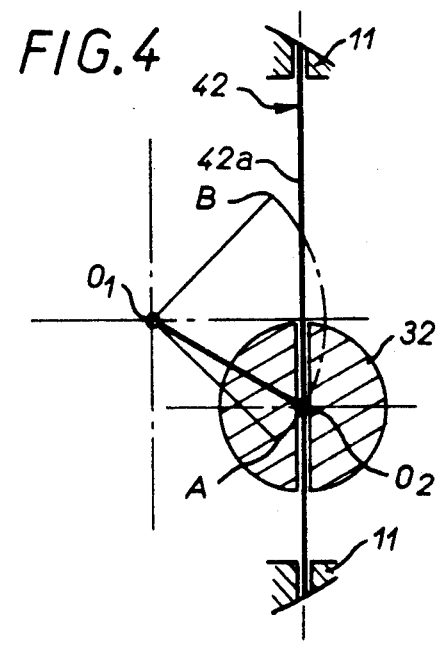
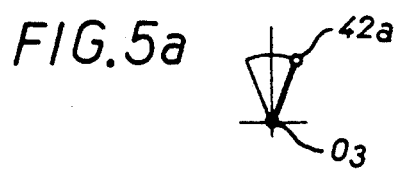
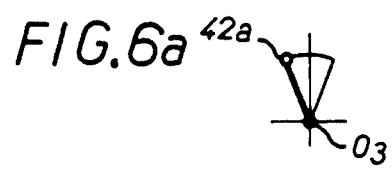
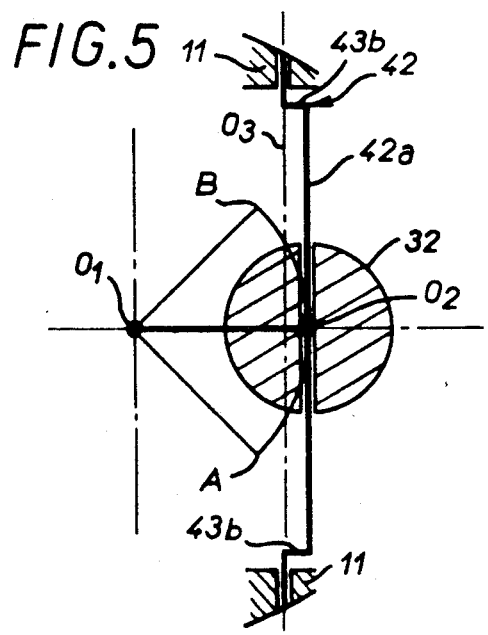
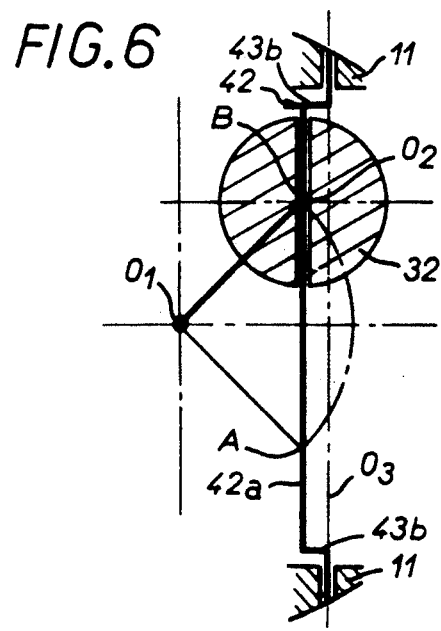

METAL BELLOWS TYPE SEALED ROTARY TRANSMISSION DEVICE

BACKGROUND OF THE INVENTION
METAL BELLOWS TYPE SEALED ROTARY TRANSMISSION DEVICE

The invention concerns a metal bellows type sealed rotary transmission device, in particular a device of this kind adapted to control a valve, in particular a quarter-turn valve of the type used for remote control in industrial installations.

The invention is more particularly concerned with an arrangement that is simple and easy to manufacture in which the bellows is effectively protected against torsion, especially if an excessively high resisting torque is applied to one shaft or if one shaft is accidentally jammed.

DESCRIPTION OF THE PRIOR ART

Numerous metal bellows type sealed transmission devices are known. In one such known device the bellows is placed around a receiver shaft controlling a valve mechanism, for example. The bellows provides isolation between this mechanism and the external environment so that, should a leak occur along the shaft, the fluid (which may be hazardous) cannot escape to the exterior.

For example, French patent application No 87.09402 now French Patent No. 2,617,567 and which corresponds to U.S. Pat. No. 4,892,010, by the same applicant describes a device in which the respective axial ends of the bellows are welded and sealed to a fixed part of the transmission device casing and a mobile transfer member inside the casing coupled to the receiver shaft and to the control shaft. For the bellows to be durable it is essential, as previously mentioned, that no torsion is applied to it. For this reason, in this prior art device the transfer member is constrained to move strictly in "circular translation". This movement is obtained positively by an appropriate kinematic coupling between the assembled parts. However, some parts of the device described are difficult to manufacture and the design principle adopted requires a physical offset between the control shaft and the receiver shaft which are disposed at opposite axial ends of the device casing and are parallel to each other. It is not possible to design a device of this kind with the control shaft and the receiver shaft aligned with each other.

A main object of the invention is to propose another bellows type sealed transmission device which comprises only a small number of easily manufactured parts and in which an appropriate kinematic coupling of the moving parts, to protect the bellows against torsion, is obtained as a "result" of mechanical interdiction means associated with the transfer member.

Another object of the invention is to propose a sealed transmission device in which said appropriate kinematic coupling does not require the control shaft and the receiver shaft to be physically offset parallel to each other.

SUMMARY OF THE INVENTION

To be more precise, the invention consists in a bellows type sealed rotary transmission device comprising a control shaft and a parallel receiver shaft, of the type in which said bellows surrounds one shaft and is fixed and sealed at one end to a fixed casing and at the other end to a transfer member mobile in said casing and coupled to the two shafts by respective eccentric linkages, characterized in that said transfer member is able to move in translation perpendicularly to the parallel shafts because it is guided by a tilting member articulated about an axis transverse to the lengthwise direction of said casing by two aligned journals perpendicular to said two shafts.

In a system of this kind torsion of the bellows is avoided (especially if one of the shafts is jammed) by the coupling between the transfer member and the tilting member, the latter being attached to the wall of the casing. If the device is used to control a valve, the shaft surrounded by the bellows constitutes a receiver shaft of the transmission device, the other shaft constituting a control shaft.

In one possible embodiment said tilting member is a crankshaft slidably inserted through a transverse bore in the transfer member so that said transfer member slides on said crankshaft. This latter comprises two said journals offset at its ends, which journals are inserted in respective aligned bearings in or carried by the wall of said casing. An arrangement of this kind is well-suited to controlling a quarter-turn valve. The crankshaft can be positioned to pass through a joggle in an enlarged part of one shaft, specifically the control shaft. In this case the crankshaft and the joggle cooperate to define end of travel abutments.

In another possible embodiment, the tilting member is a sleeve disposed around the bellows. The sleeve is articulated near one end to said transfer member and near its other end to said casing. The sleeve is provided with two aligned transverse bearings in which are inserted two aligned shafts carried by the transfer member. As a result of this construction, the transfer member and the tilting member do not meet and the device, capable of rotation through 360° or more, can be coupled to any rotating member, including a motor.

The invention will be better understood and other advantages of the invention will emerge more clearly from the following description of a number of embodiments of a sealed rotary transmission device in accordance with the invention given by way of example only with reference to the appended drawings, in which:

BRIEF DESCRIPTION OF THE DRAWINGS

FIGS. 3 through 6 and FIGS. 3a through 6a are simplified schematic views respectively showing the coupled transfer and pivoting members, on the one hand, and the pivoting member seen end-on, on the other hand, for different positions of the control shaft;

DETAILED DESCRIPTION OF PREFERRED EMBODIMENTS

Figure 1:
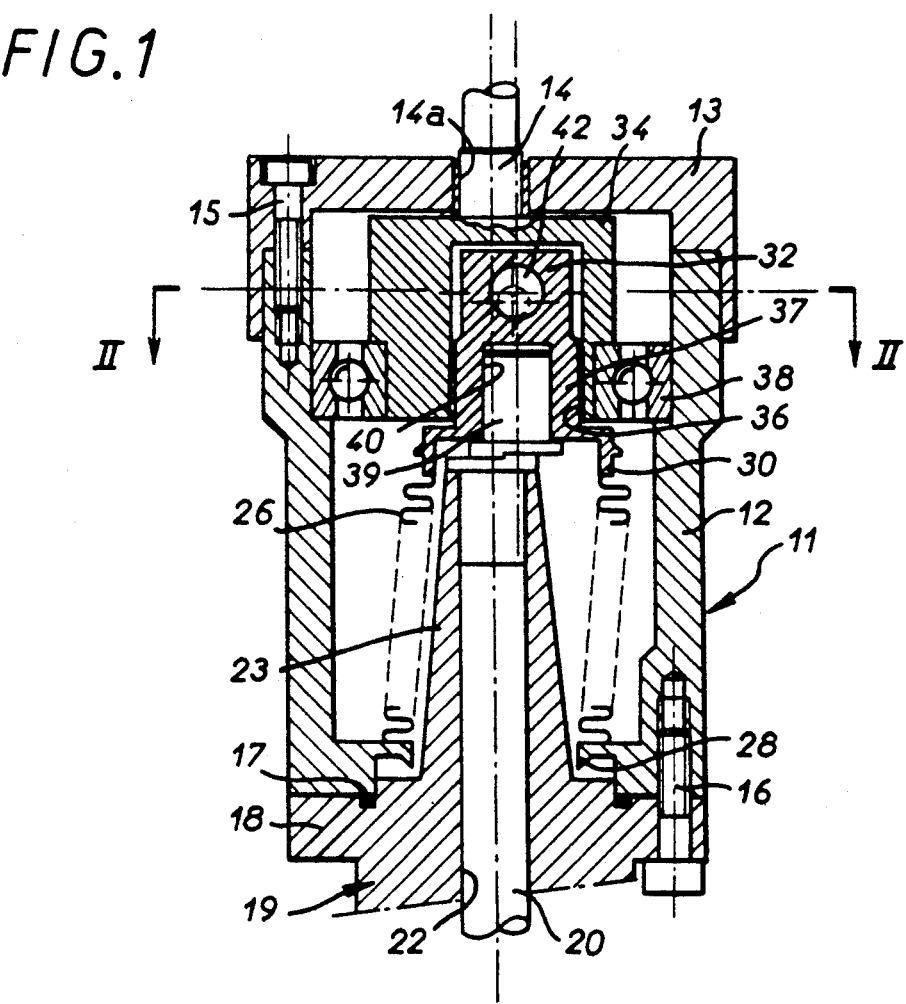
FIG. 1 is a view in elevation of a bellows type control device in accordance with the invention in cross-section of the line I—I in FIG. 2.

Referring to FIGS. 1 through 6 in particular, the sealed transmission device comprises a casing 11 in the form of a generally cylindrical tubular body 12 and a cover member 13 in which a first shaft, in this case a control shaft 14 is rotatably mounted. The shaft 14 projects axially from the centre of the cover 13 through a hole in the cover forming a bearing 14a. The cover is fixed to the tubular body 12 by bolts 15. At its opposite axial end the body 12 is attached by bolts 16 to a flange 18 of a structural member 19 enclosing a mechanism (not shown—a quarter-turn valve, for example) operated by a second shaft, in this case a receiver shaft 20 of the transmission device. An O-ring 17 seals the tubular body 13 to the structural member 19. The receiver shaft 20 is guided by a bore 22 in a bush 23 which is part of the structural member 19. A metal bellows 26 surrounds the bush 23 and therefore the receiver shaft 20. The bellows is fixed and sealed at one end to the casing 11. To be more precise, it is welded to a ring 28 projecting inwardly from the wall of the tubular body 12 near the end of the latter attached to the structural member 19. The other end of the bellows is attached and sealed (welded) to a ring 30 which is part of a transfer member 32 mobile in the casing 11. The two shafts 14 and 20 are at least parallel. In this embodiment the bores 14a and 22 are aligned on the axis of symmetry of the tubular body 12 so that the shafts 14 and 20 are aligned (except for the parts by which they are coupled to the transfer member).

The control shaft 14 is coupled to the transfer member 32 by eccentric linkages in the form of an enlarged part 34 of the control shaft 14 inside the casing 11 comprising a cylindrical bearing 36 whose axis is parallel to but spaced from the control shaft 14 inside which is guided a cylindrical portion 37 of the transfer member coaxial with the ring 30 to which the bellows is attached. The enlarged part 34 of the control shaft is rotatably mounted in the casing by means of a ball bearing 38.

The receiver shaft 20 is coupled to the transfer member 32 by an eccentric linkage in the form of a crank 39 at the inner end of the shaft 20. The crank is inserted in a bore 40 in the transfer member. In this example the bore 40 is coaxial with and formed in the cylindrical portion 37. The dimensions of the bearing 36 are such that the transfer part 32 can rotate and move in translation (by a small amount, as will be explained later) inside the bearing.

The transfer member 32 is guided, in such a way that it can move in translation perpendicular to the length of the shafts 14 and 20, by a tilting member 42 in the form of a crankshaft articulated about an axis transverse to the length of the casing (in other words about an axis perpendicular to the shafts 14 and 20) by means of two aligned journals 43a, 43b. The tilting crankshaft member 42 comprises a shaft 42a which is a sliding fit through a transverse bore 45 in the transfer member 32. It comprises two journals 43a, 43b at respective ends of the shaft 42a. These journals are offset to form the "cranks" as it were of said crankshaft. Said journals are inserted in aligned bearings 46 accommodated in bores formed in the wall of the casing 11 or otherwise carried by said wall. Also, this crankshaft is level with the enlarged part 34 of the shaft 14. In other words, the bore 45 is formed in the part of the transfer member which is inserted in the bore 36 in said enlarged portion 34. To this end, said enlarged portion 34 comprises a double joggle 48 open laterally and through which the shaft 42a passes. The angular movement of the control shaft 14 is therefore limited, to one quarter-turn, for example, by cooperation of the joggle with the shaft 42a.

The operation of the device just described will now be described with reference to FIGS. 3 through 6 and FIGS. 3a through 6a.

These schematic drawings show the transfer member 32 and the tilting member 42 forming the crankshaft. The latter is articulated at its end to the casing 11 by the journals 43a, 43b. The axis $O_1$ is the common axis of the shafts 14 and 20. The axis $O_2$ is that of the transfer member 32 and therefore that of the crank 39. The tilting member 42 oscillates about the axis $O_3$ of the aligned journals 43a, 43b. The two end positions of the axis $O_2$ of the transfer member are denoted A and B. Projected onto a plane parallel to that of FIGS. 3 through 6, the trajectory of the transfer member is therefore the arc $AO_1B$. As it moves along said trajectory, it slides on the shaft 42a of the tilting member which oscillates about the axis $O_3$. Because of this, the transfer member 32 is prevented from turning and the bellows 26 attached to it is not twisted.

In FIGS. 3 and 3a, the transfer member is at one of its end positions, with its axis $O_2$ at A. The tilting member 42 is inclined to the maximum extent in one direction ("to the left" in FIG. 3a).

In FIGS. 4 and 4a the axis of the shaft 42a is at the middle of its trajectory, in a "vertical" plane containing the axis $O_3$. The axis $O_2$ is also in this plane.

Figure 2:
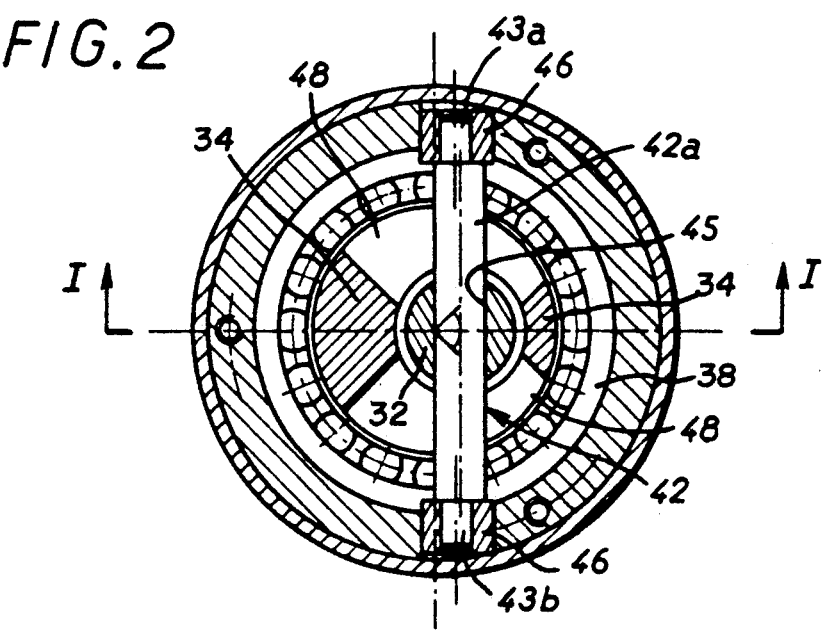
FIG. 2 is a view in cross-section on the line II—II in FIG. 1.

In FIGS. 5 and 5a the transfer member 32 is at the middle of its trajectory and the tilting member 42 is inclined to the maximum extent in the opposite direction ("to the right" in FIG. 5a). This is also the position in which the device is shown in FIGS. 1 and 2.

In FIGS. 6 and 6a, the transfer member is at its other end position, with its axis $O_2$ at B. The tilting member is again inclined to the maximum extent "to the left".

Note that, for the tilting member 42 to oscillate by the same amount "to the left" and "to the right", the axis $O_3$ is located in a plane perpendicular to the plane bisecting the trajectory AB of the transfer member and passing through the centre of the sagitta of the arc $AO_1B$.

Note also that in this embodiment the tilting member imparts to the transfer member and therefore to the bellows a movement about the axis $O_2$. This movement is of very small amplitude, however. Thus, in the embodiment shown in which the eccentricity of the crank 39 is 5 mm, the angle $AO_1B$ is 90° and the eccentricity of the crankshaft constituting the tilting member is 2.5 mm, the amplitude of this movement (equal to the sagitta f of the arc through which the axis of the shaft 42a pivots) is equal to 0.1 mm, which has no effect on the durability of the bellows.

Figure 7:
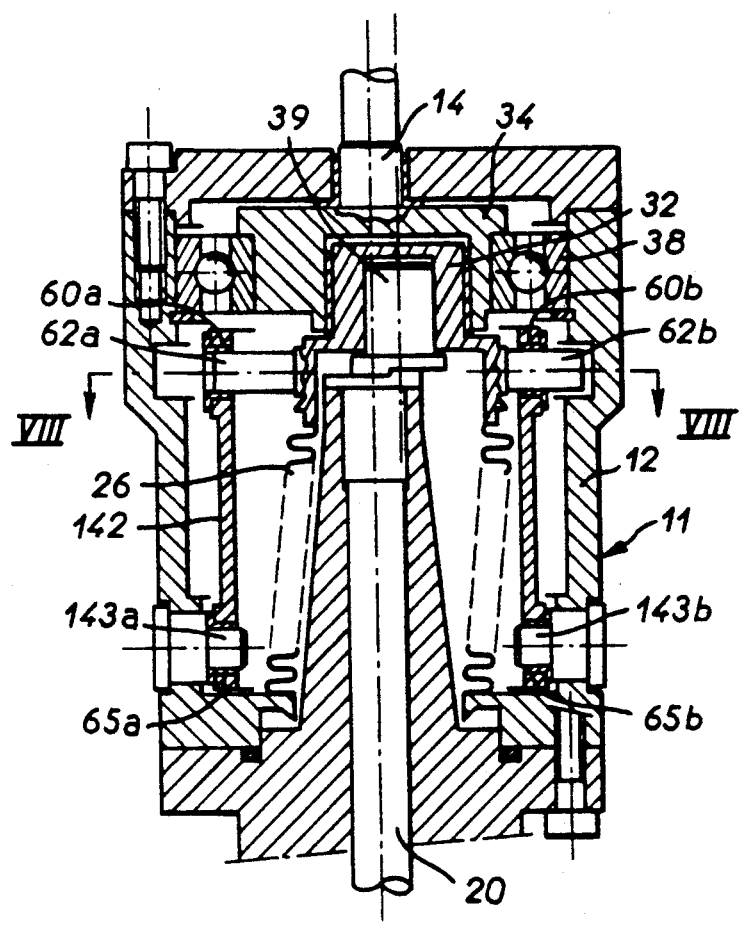
FIG. 7 is a view in elevation of another embodiment of bellows type control device in accordance with the invention cross-section on the line VII—VII in FIG. 8.
Figure 8:
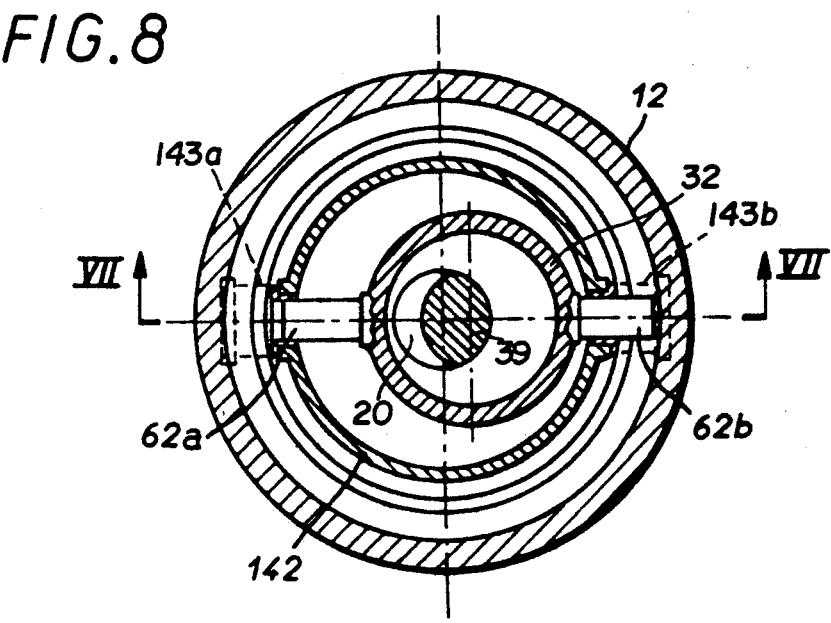
FIG. 8 is a view in cross-section on the line VIII—VIII in FIG. 7.

FIGS. 7 and 8 show an alternative embodiment in which the shape and the disposition of the tilting member enable the transmission of a rotational movement through any angle, including continuous rotation. In this embodiment structural members similar to those of FIGS. 1 and 2 carry the same reference numbers and will not be described again. The enlarged part 34 of the shaft 14 and the transfer member 32 are unchanged overall but their axial dimension is shorter, other things being equal, as they no longer accommodate the tilting member. This comprises a tubular sleeve 142 disposed around the bellows 26. It is articulated to the transfer member 32 near one end and to the casing 11 near the other end. To enable this the sleeve is provided with two first aligned transverse bearings 60a, 60b in which are inserted respective aligned shafts 62a, 62b. These shafts are sufficiently long to enable sliding displacement of the transfer member relative to the sleeve without either being able to become disengaged from the corresponding bearing.

Also, the two previously mentioned aligned journals 143a, 143b are carried by the walls of and project into said casing. These journals are inserted in respective aligned transverse second bearings 65a, 65b. The common axis of these second bearings is parallel to that of said first bearings. These two axes are situated near respective ends of the sleeve, in other words as far apart as possible, to limit the amount by which the bellows is stretched during a complete rotation.

The operation of this device is similar to that of the device previously described, but because the rotation of said enlarged part 34 of the input shaft is not limited by the tilting member, which is entirely below it, the device can transmit rotation movement through any angle, including continuous rotation.

Of course, the invention is not limited to the embodiments that have just been described. In particular, referring to FIG. 7, it is clear that the longitudinal stretching of the bellows depends on the distance between the first and second bearings. However, it is possible to eliminate this stretching so that movement of the transfer member 32 is kept to strict circular translation. It is sufficient to provide a further, longitudinal degree of freedom between the journals 143a, 143b and the tilting member (sleeve) or between the journals and the casing.

It is then sufficient for the journals 143a, 143b to be able to slide longitudinally by a very small amount in the wall of the casing or for the sleeve constituting the tilting member to be able to slide parallel to the axis of the casing relative to said journals.

We claim:

1. A sealed rotary transmission device comprising a casing, a control shaft, a receiver shaft extending in the same direction as said control shaft, both of said shafts being mounted in said casing, a bellows in said casing and a transfer member mobile in said casing, said bellows having two opposite ends and surrounding one of said shafts, one end of said bellows being fixed and sealed to said casing and the other end being fixed and sealed to said transfer member, said transfer member is coupled to the two said shafts by respective eccentric linkages, a tilting member is mounted in said casing, two aligned journals disposed perpendicular to said shafts are provided for articulation of said tilting member about an axis transverse to a lengthwise direction of said casing and said transfer member is coupled to said tilting member and guided thereby in said casing with translation ability perpendicular to said shafts.

2. The transmission device according to claim 1 wherein the control shaft and the receiver shaft are aligned with each other.

3. The transmission device according to claim 1 wherein the eccentric linkage between the control shaft and said transfer member comprises an enlarged part of said control shaft rotatably mounted in said casing and comprising a bearing parallel to said control shaft inside which is guided a cylindrical portion of said transfer member coaxial with the perimeter of a ring between said transfer member and said bellows.

4. A transmission device according to claim 1 wherein the eccentric linkage between said transfer member and said receiver shaft comprises a crank at one end of said receiver shaft inserted in a bore in said transfer member.

5. A transmission device according to claim 1 wherein said tilting member is a crankshaft slidably inserted through a transverse bore in the transfer member and comprising the two journals axially offset at its ends, which journals are inserted in respective aligned bearings in or carried by the wall of said casing.

6. A transmission device according to claim 1 wherein the enlarged part of said control shaft is rotatably mounted in the casing by means of a ball bearing.

7. A transmission device according to claim 1 wherein the tilting member is a tubular sleeve disposed around said bellows and said sleeve is articulated near one end to said transfer member and near the other end to said casing and provided with two aligned transverse first bearings in which are respectively inserted two aligned shafts carried by said transfer member.

8. A transmission device according to claim 7 wherein the aligned journals are carried by the walls of said casing, project into said casing and are inserted in respective aligned transverse second bearings of said sleeve parallel to said first bearings.

9. A transmission device according to claim 8 wherein the aligned journals carried by the walls of said casing are mobile longitudinally relative to said casing to enable circular translation movement of said transfer member.

10. A transmission device according to claim 8 wherein the sleeve is mobile longitudinally relative to said aligned journals.

11. A transmission device according to claim 3 wherein the tilting member is a crankshaft slidably inserted through a transverse bore in the transfer member and comprising the aforementioned two journals axially offset at its ends, which journals are inserted in respective aligned bearings in or carried by the wall of said casing and said crankshaft passes through a joggle of said enlarged part of said control shaft so that the angular movement of the latter is limited to a predetermined value.

12. A sealed rotary transmission device comprising a control shaft, a receiver shaft aligned with said control shaft, a bellows having an upper end and a lower end surrounding said bellows, the lower end of said bellows being fixed and sealed to the lower end of said casing, a movable transfer member is disposed in the upper end of said casing and operably connects the control shaft to the receiver shaft by an eccentric linkage portion of the control shaft and an eccentric linkage portion of the receiver shaft, the upper end of said bellows is fixed and sealed to said transfer member, two journals are disposed in said casing and aligned perpendicularly to said shafts, a tilting member is operably connected to the journals for articulation of said tilting member about an axis transverse to the lengthwise direction of said shafts, and said transfer member is operably connected to said tilting member and guided thereby in said casing with translation ability perpendicular to said shafts.

13. A sealed rotary transmission device comprising a control shaft, a receiver shaft axially aligned with said control shaft, a bellows having an upper end and a lower end surrounding said receiver shaft, a casing having an upper end and a lower end surrounding said bellows, the lower end of said bellows being fixed and sealed to the lower end of said casing, the upper end of said bellows is fixed and sealed to said transfer member, said control shaft comprises a crank means of said control shaft and the crank of said receiver shaft are eccentric to the axis of the respective control shaft and receiver shaft, the crank means of the control shaft and the crank of the receiver shaft are each operably connected to said transfer member to allow movement of said transfer member in said casing, two journals are disposed in said casing and aligned perpendicularly to said shafts, a tilting member is operably connected to the journals for articulation of said tilting member about an axis transverse to the lengthwise direction of said shafts, and said transfer member is operably connected to said tilting member and guided thereby in said casing with translation ability perpendicular to said shafts.

* * * * *